July 30, 1940.  A. L. MUNSON  2,209,628

INDICATOR GAUGE ATTACHMENT

Filed Nov. 29, 1938

Inventor
Arthur L. Munson

By Owen & Owen

Attorneys

Patented July 30, 1940

2,209,628

UNITED STATES PATENT OFFICE 2,209,628

INDICATOR GAUGE ATTACHMENT

Arthur L. Munson, Toledo, Ohio

Application November 29, 1938, Serial No. 242,969

3 Claims. (Cl. 33—172)

This invention relates to attachments for indicator gauges and is particularly directed to an attachment for that type of gauge having a reciprocable work contacting member.

The primary object of the invention is the provision of an attachment for an indicator gauge having a reciprocable work contacting member which is operable in a plurality of positions, so that the user may maintain the indicator dial in the most readable position regardless of the location of the work piece on which the gauge is being used.

Another object of the invention is the provision of a mechanism to transmit movement from a work contacting finger to the stem of an indicator gauge in a positive and efficient manner which eliminates lost motion, and in which the working pressure and forces are kept apart from the indicator body.

Another object of the invention is the provision of an attachment which will accomplish these and other objects and which may still be inexpensively constructed and maintained.

Other objects and advantages of the invention will become apparent as the description proceeds, reference being had to the accompanying drawing in which—

Figure 1:
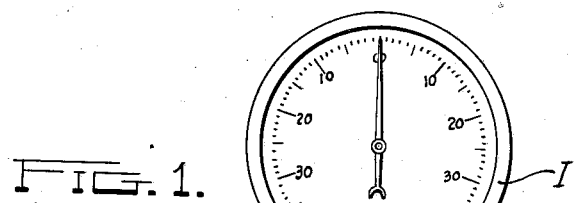
Figure 2:
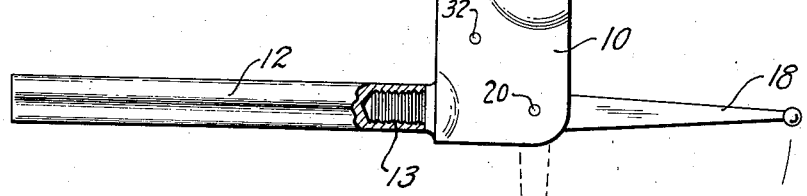
Figure 3:
Figure 4:
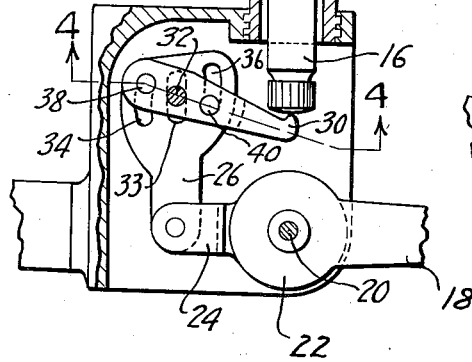
Figure 4:
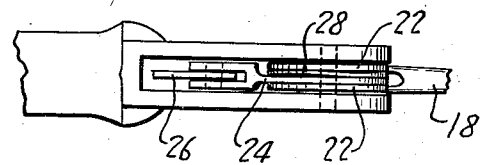

Figure 1 is a side elevation with parts broken away of the attachment and an indicator gauge applied thereto; Fig. 2 is a fragmentary sectional view showing the interior arrangement of the attachment; Fig. 3 is a fragmentary bottom view of the attachment alone, and Fig. 4 is a section on line 4—4 of Fig. 2.

Referring to the drawing, the attachment includes a casing 10 to which is connected a stem 12 by which the attachment and indicator may be fixed in a portion of a machine tool when in use. The stem 12 is threaded as at 13 to the casing 10 and may thus be received in a tool post of a lathe or in the chuck portion of a milling machine spindle or in any other location or machine where it is desired to fix the indicator. While the stem has been shown as straight, any suitable form may be threaded on so long as its center line is properly disposed with relation to the remaining parts.

A suitable dial indicator I of the type having a reciprocable contact point is adapted to be received in the attachment by projecting the contact point through the center of a chuck 14 which latter engages a fixed part of the gauge. The contact point of the gauge is designated 16 in Fig. 2 and may be of any suitable construction.

The present invention is particularly directed to a means to transmit motion from a finger 18 to the contact point 16 of the associated gauge. To this end, the finger 18 is pivotally mounted on a bearing 20 aligned with the stem 12 and with the contact point 16. The finger 18 is bifurcated at its inner end and provided with enlarged flanges 22. A lever 24 is provided and has one end received over the bearing 20 and connects at its other end, in a pivoted connection, with a link 26. Both the finger 18 and lever 24 are free to rotate on bearing 20 and motion is transmitted between the two parts by any suitable means such as a spring washer 28 which biases the lever 24 into intimate engagement with one or the other of the flanges 22. It will therefore be seen that when the finger 18 moves in response to undulations of the surface of a work piece, such movement will be transmitted to and through lever 24.

An actuating arm 30 is pivotally mounted in the casing 10 on pivot pin 32 and has one end constantly engaged with the contact finger 16 of the associated dial indicator gauge. At the end adjacent its pivot point the arm 30 is bifurcated to receive the upper end of link 26.

The link 26 is provided with a central slot 33 and two curvilinear side slots 34 and 36. Pins 38 and 40 extend between the bifurcations of the arm 30 and pass through slots 34 and 36 respectively of the link member. One of the pins is constantly at the top and the other is constantly at the bottom of its respective slot so that regardless of the linear movement of link 26, whether in an up or down direction in Fig. 2, a pivoting action of the arm 30 will result. Thus, if the movement is down in the figure shown in the drawing, the pin 38 engaging the top of slot 34, will move arm 30 in a counter-clockwise direction, while if the movement is in an upward direction, the same rotation of the arm 30 will be caused by pin 40 striking the bottom of its associated slot 36. Obviously the spring of the indicator gauge is used to bias the arm 30 in a clockwise direction and hence maintain a constant pressure on the link 26 through pins 38 and 40.

In operation the finger 18 may be swung from a horizontal position as shown in Fig. 1 to a vertical position as shown in the dotted line position in Fig. 1. Such swinging motion takes place against the force of the spring washer 28. Any of these positions may be selected which will give the dial of the indicator gauge the most convenient and readable location for the operator. After the finger 18 has once been set, slight movements thereof caused by surface irregularities in a work piece will be transmitted to lever 24, through link 26 and actuating arm 30 to the indicator gauge, and may be read on the dial thereof. Where it has previously been necessary to provide one attachment for an indicator when used to measure undulations which are axial with respect to the contact stem and another attachment to be used when such undulations are in a plane perpendicular to the contact stem, the present invention accomplishes the work of both of these attachments and in addition may be used in any intermediate setting. In one position the finger 18 is aligned with stem 12 and in the other position (dotted in Fig. 1) the finger is axially aligned with the contact point 16 of the indicator gauge.

It will be appreciated that, as the attachment is anchored by the stem 12 and the indicator itself held in place by chuck 14 the force exerted on finger 18 does not tend to move the body of the indicator, but is taken by the attaching stem 12. Further, by suitably forming the anchoring stem 12, various positions may be assumed by the attachment.

While the invention has been described in connection with a particular form and disposition of the parts, it should be appreciated that various changes and modifications will suggest themselves to those skilled in the art and that such changes may be made without departing from the invention as defined in the appended claims.

What I claim as new and desire to secure by United States Letters Patent is:

1. An attachment of the character described adapted to receive an indicator gauge having a reciprocable contact point, said attachment including a housing, a pivoted actuating arm mounted in said housing and engaging said contact point, a contact finger mounted in said housing, said finger being swingable to a plurality of positions, and means to transmit motion from said contact finger to said actuating arm, said means including a link and pins interposed between said link and said actuating arm and adapted to cause a positive unidirectional rotation thereof regardless of the direction of movement of said link.

2. An attachment of the character described adapted to receive an indicator gauge having a reciprocable contact point, said attachment including a housing, a pivoted actuating arm mounted in said housing and engaging said contact point, a contact finger mounted in said housing, said finger being swingable to a plurality of positions, and means to transmit motion from said contact finger to said actuating arm, said means including a link, pins interposed between said link and said actuating arm and adapted to cause a positive unidirectional rotation thereof for either direction of movement of said link, and a friction connection adjacent said contact finger.

3. An attachment of the character described adapted to receive a standard indicator gauge having a reciprocable contact point, said attachment including a housing, a contact finger mounted in said housing and swingable to a plurality of positions, means to transmit motion from said contact finger to the contact point of said indicator gauge, and an anchoring stem fixed to the body of the housing at right angles to the axis of the contact point of said indicator gauge and aligned with the axis of rotation of said contact finger, said stem serving as the sole anchoring means for the attachment and gauge when in use whereby actuating forces on said contact finger are taken by said stem apart from the body of the indicator gauge.

ARTHUR L. MUNSON.